(12) United States Patent
Henderson et al.

(10) Patent No.: US 9,428,228 B2
(45) Date of Patent: Aug. 30, 2016

(54) DRAG REDUCING MIRROR ASSEMBLIES FOR VEHICLES

(71) Applicant: SmartTruck Systems, LLC, Greenville, SC (US)

(72) Inventors: Michael Lorenzo Henderson, Piedmont, SC (US); Stephen Alfred Wulff, Simpsonville, SC (US)

(73) Assignee: SmartTruck Systems, LLC, Greenville, SC (US)

( * ) Notice: Subject to any disclaimer, the term of this patent is extended or adjusted under 35 U.S.C. 154(b) by 0 days.

(21) Appl. No.: 14/935,570

(22) Filed: Nov. 9, 2015

(65) Prior Publication Data
US 2016/0059909 A1    Mar. 3, 2016

Related U.S. Application Data

(63) Continuation of application No. 13/827,512, filed on Mar. 14, 2013, now Pat. No. 9,205,778.

(51) Int. Cl.
*G02B 5/08*     (2006.01)
*B62D 35/00*   (2006.01)
*B60R 1/06*     (2006.01)

(52) U.S. Cl.
CPC .............. *B62D 35/00* (2013.01); *B60R 1/0605* (2013.01); *B60R 1/0617* (2013.01); *B62D 35/001* (2013.01)

(58) Field of Classification Search
CPC ......... B60R 1/076; B60R 1/078; B60R 1/06; B60R 1/0605; B60R 1/1207; B60R 1/0617; B62D 35/00; B60D 35/001

USPC ................................. 359/838, 841, 871, 872
See application file for complete search history.

(56) References Cited

U.S. PATENT DOCUMENTS

| | | | |
|---|---|---|---|
| 5,069,538 A | 12/1991 | Shust et al. | |
| 5,179,470 A * | 1/1993 | Olson | B60R 1/0602 359/871 |
| 6,010,222 A | 1/2000 | Olson et al. | |
| 8,285,457 B1 | 10/2012 | Askew | |
| 2006/0238906 A1 | 10/2006 | Stonecypher | |

FOREIGN PATENT DOCUMENTS

JP          11/029080          2/1999

(Continued)

OTHER PUBLICATIONS

International Search Report—PCT/US2012/024982, of Feb. 22, 2011.

(Continued)

*Primary Examiner* — Euncha Cherry
(74) *Attorney, Agent, or Firm* — Dority & Manning, P.A.

(57) ABSTRACT

A side-view mirror assembly for a vehicle is disclosed. The mirror assembly may generally include a mirror housing configured to support a mirror. The mirror housing may define an airfoil shape have a first side surface and a second side surface extending between a forward edge and an aft edge. In addition, the mirror housing may be movable between a first position, wherein the mirror housing is aerodynamically aligned with an airflow flowing past the vehicle, and a second position, wherein the mirror reflects a rearwardly extending side-view of the vehicle.

19 Claims, 8 Drawing Sheets

(56) References Cited

FOREIGN PATENT DOCUMENTS

| JP | 2007/076451 | 3/2007 |
|----|----|----|
| JP | WO 2009/280196 | 12/2009 |
| WO | WO 2009/029978 | 3/2009 |
| WO | WO 2012/115818 | 8/2012 |

OTHER PUBLICATIONS

FUN3D Analysis & Design. webpage: fun3d-larc-nasa-gov—Karen Bibb, NASA Development Team.
International Search Report—PCT/US2014/019780 of May 28, 2014.

* cited by examiner

DRAG REDUCING MIRROR ASSEMBLIES FOR VEHICLES

CROSS-REFERENCE TO RELATED APPLICATIONS

This application is a continuation of and claims priority to U.S. patent application Ser. No. 13/827,512, titled "Drag Reducing Mirror Assemblies for Vehicles" and having a filing date of Mar. 14, 2013, the disclosure of which is hereby incorporated by reference herein for all purposes.

FIELD OF THE INVENTION

The present subject matter relates generally to vehicles, such as heavy duty vehicles, and, more particularly, to an airfoil-shaped mirror assembly that may be used to reduce drag loads on vehicles.

BACKGROUND OF THE INVENTION

As energy costs continuously rise, fuel economy has become an increasingly important consideration in vehicle design. For example, ongoing design efforts have been directed towards reducing vehicle drag. As is generally understood, as the drag on a vehicle increases, the amount of fuel needed to move the vehicle also increases. For instance, it has been stated that for a vehicle traveling at 70 mph, about 65% of the total fuel consumption of the vehicle's engine is used to overcome drag. Therefore, even a small reduction in the drag experienced by a vehicle traveling at highway speeds can result in a significant improvement in fuel economy.

For instance, heavy-duty vehicles, such as tractor-trailers (also known as semi tractors, tractors, class 8 long haul trucks, transfer trucks, 18-wheelers, semis, etc.) have a tall and wide box-shaped profile that creates a significant amount of drag compared to other common road vehicles (e.g., cars and light trucks). For instance, Table I lists the common drag coefficients for road vehicles.

TABLE I

| Type of Vehicle | Drag Coefficient (Cd) |
| --- | --- |
| Low Drag Production Car | 0.26 |
| Typical Sedan | 0.3-0.35 |
| Sport Utility Vehicle | 0.4-0.5 |
| Pick-up Truck | 0.4-0.5 |
| Tractor trailers | 0.59-0.63 |

In addition, heavy duty vehicles are typically equipped with large side-view mirror assemblies that extend outboard of the vehicle's body structure. Unfortunately, because such side mirror assemblies increase the lateral profile of the vehicle, the assemblies increase the drag on the vehicle, thereby resulting in a corresponding reduction in fuel economy. For example, FIG. 1 illustrates a partial, top view of a vehicle 10 having a conventional side mirror assembly 12 installed thereon. As shown, the mirror assembly 12 includes a mirror 14 (shown in dashed lines) and a mirror housing 16 configured to support the mirror 14 at a suitable position for allowing the driver to obtain a rearward view along the side of the vehicle 10. Due to the width of the mirror 14 and the angle that the mirror 14 must be oriented relative to the vehicle 10 to provide the driver a suitable rearwardly-directed viewing angle, the mirror housing 16 defines a relatively large effective width 18 within the airflow flowing along the side of the vehicle 10. As such, the illustrated mirror assembly 12 typically results in a substantial increase in the vehicle drag.

As a solution to the additional drag resulting from conventional side-view mirror assemblies, attempts have been made to eliminate the necessity of such mirror assemblies. For example, vision systems have been developed that utilize one or more cameras and associated display monitors to provide rear and/or side views of the vehicle to the driver. Specifically, cameras are typically mounted at one or more locations on the vehicle (e.g., on the side and/or at the back of the vehicle) and are electronically coupled to a display monitor(s) installed on and/or within a component(s) of the vehicle (e.g., within the dashboard, within the side-view mirror and/or at any other suitable location). The driver may then look at the display monitor(s) to gain access to side and/or rear views of the vehicle without necessity of relying on mirrors. However, current regulations require that vehicles include physical side-view mirrors that can be used by the driver in the event that the vision system fails. Accordingly, even for vehicles with sophisticated visions systems, side-view mirror assemblies must still be available for back-up purposes.

Thus, a need exists for improved aerodynamic mirror assemblies that are designed to provide drag reduction. Methods relating to the utilization of such mirror assemblies would also be beneficial. Moreover, retrofit kits for incorporating such mirror assemblies into vehicles would also be beneficial.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a side-view mirror assembly for a vehicle. The mirror assembly may generally include a mirror housing configured to support a mirror. The mirror housing may define an airfoil shape have a first side surface and a second side surface extending between a forward edge and an aft edge. In addition, the mirror housing may be movable between a first position, wherein the mirror housing is aerodynamically aligned with an airflow flowing past the vehicle, and a second position, wherein the mirror reflects a rearwardly extending side-view of the vehicle.

In another aspect, the present subject matter is direct to a vehicle including a chassis and a cab supported by the chassis. The vehicle may also include mounting structure coupled to and extending outwardly from the cab and a mirror assembly coupled to the mounting structure. The mirror assembly may generally include a mirror housing configured to support a mirror. The mirror housing may define an airfoil shape have a first side surface and a second side surface extending between a forward edge and an aft edge. In addition, the mirror housing may be movable between a first position, wherein the mirror housing is aerodynamically aligned with an airflow flowing past the vehicle, and a second position, wherein the mirror reflects a rearwardly extending side-view along a side of the vehicle.

In a further aspect, the present subject matter is directed to a side-view mirror assembly for a vehicle. The mirror assembly may generally include a mirror housing configured to support a mirror. The mirror housing may define an airfoil shape have a first side surface and a second side surface extending between a forward edge and an aft edge. The mirror may be angled relative to the second side surface such that the mirror reflects a rearwardly extending side-view of the vehicle.

In yet another aspect, the present subject matter is directed to a method for enhancing the operation of a vehicle. The method may generally include operating the vehicle with a side-view mirror assembly installed thereon, wherein the mirror assembly includes a mirror housing defining an airfoil shape have a first side surface and a second side surface extending between a forward edge and an aft edge. In addition, the method may include moving the mirror housing to a first position at which the mirror housing is aerodynamically aligned with an airflow flowing past the vehicle and moving the mirror housing to a second position at which a mirror of the mirror assembly reflects a rearwardly extending side-view of the vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
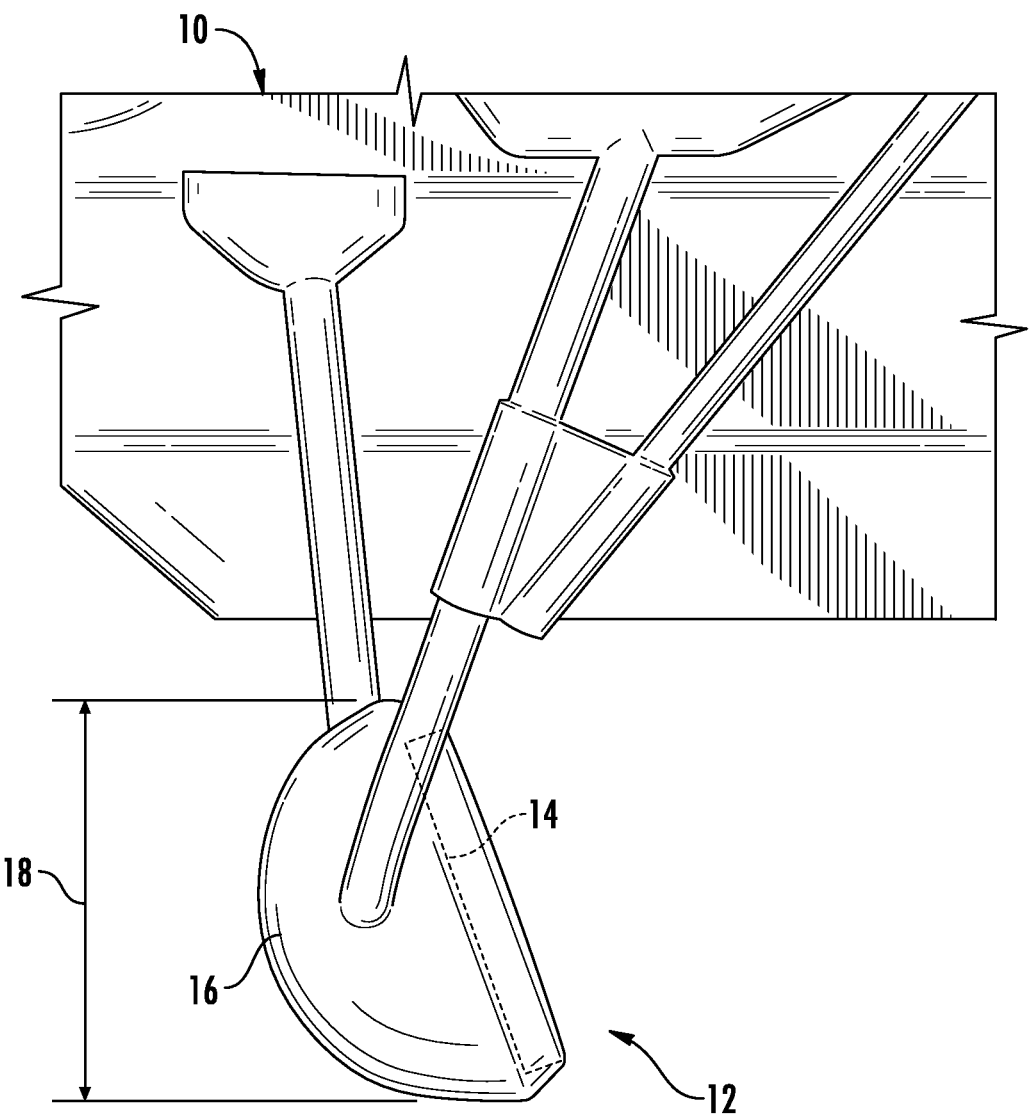
FIG. 1 illustrates a top view of a conventional side mirror assembly installed onto a vehicle.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to drag reducing side-view mirror assemblies for use with vehicles, such as heavy-duty vehicles. Specifically, the present subject matter discloses a side-view mirror assembly having an airfoil-shaped mirror housing. During operation of the vehicle, the housing may be configured to be aerodynamically aligned with the flow of air around the vehicle (including the crossflow generated by the windshield), thereby resulting in a significant reduction in vehicle drag and also allowing for the generation of a significant amount of thrust. Such a reduction in vehicle drag, along with the generation of thrust, may, in turn, translate into improved fuel economy, reduced emissions of carbon dioxide, as well as other improved efficiencies.

In addition, the disclosed mirror assembly may also be utilized as a means for stabilizing the vehicle. Specifically, the mirror assembly may stabilize the airflow along the vehicle so as to inhibit flow separation along the side of the cab, thereby preventing side-to-side motion of the vehicle. Such stabilization is often necessary to provide the desired operation and performance for many heavy-duty vehicles.

It should be appreciated that, in several embodiments of the present subject matter, the disclosed mirror assembly may be configured to serve primarily as a means for reducing drag and/or generating thrust and only secondarily as an actual side-view mirror. For example, in several embodiments, the mirror housing may be movable between a first position, wherein the housing is aerodynamically aligned with the air flowing around the vehicle, and a second position, wherein the mirror supported within the mirror housing may actually be used as a side-view mirror. As such, for a vehicle with a side-view vision system, the driver may rely on the vision system for gaining access to rearwardly extending side-views of the vehicle, thereby allowing the mirror housing to be maintained in its first portion for reducing drag and/or generating thrust. However, if the vision system fails or is otherwise not functioning properly, the mirror housing may be moved to its second position so that the mirror supported therein may be used to provide the required side-views to the driver. It should be appreciated that suitable electronic side and/or rear vision systems are commercially available and are well known in the art. For instance, exemplary side/rear vision systems are described in U.S. Pat. Nos. 5,289,321 and 6,954,152, and the references cited therein, all of which are hereby incorporated by reference herein in their entirety for all purposes.

It should also be appreciated that, as used herein, drag (also referred to as air resistance or fluid resistance) refers to forces that oppose the relative motion of an object through a fluid (a liquid or gas). Drag forces act in a direction opposite to the velocity of the vehicle. Unlike other resistive forces such as dry friction, which is nearly independent of velocity, aerodynamic drag forces are dependent on the square of the velocity. For a solid object moving through a fluid, the drag is the component of the net aerodynamic or hydrodynamic force acting opposite to the direction of the movement. Therefore drag opposes the motion of the object, and in a powered vehicle it is overcome by thrust provided by the engine through the vehicle's drive train.

Figure 2:
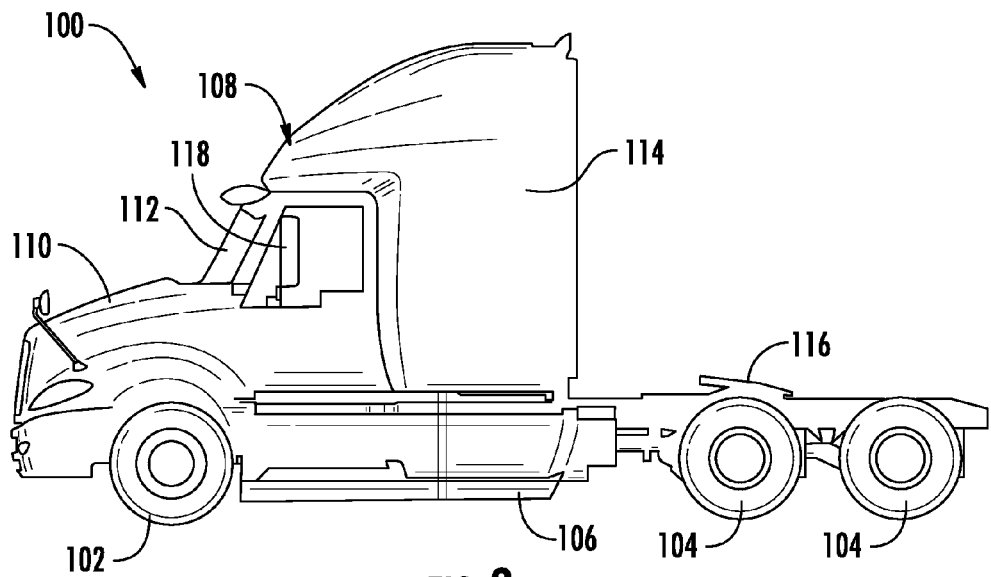
FIG. 2 illustrates a side view of one embodiment of a heavy duty vehicle having side mirror assemblies installed thereon in accordance with aspects of the present subject matter.
Figure 3:
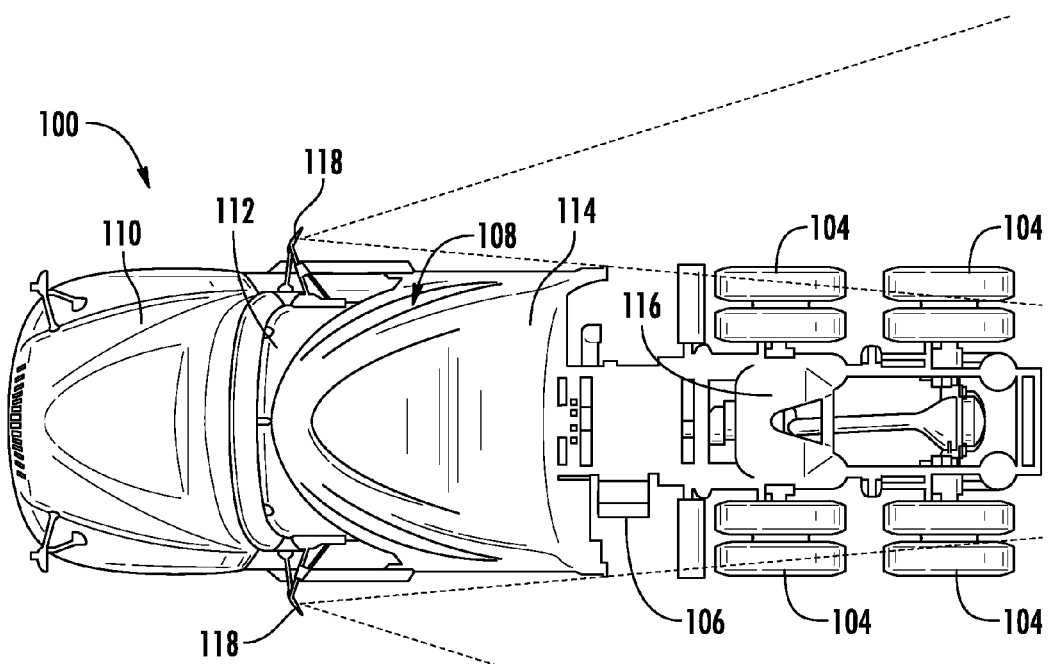
FIG. 3 illustrates a top view of the vehicle shown in FIG. 2.
Figure 4:
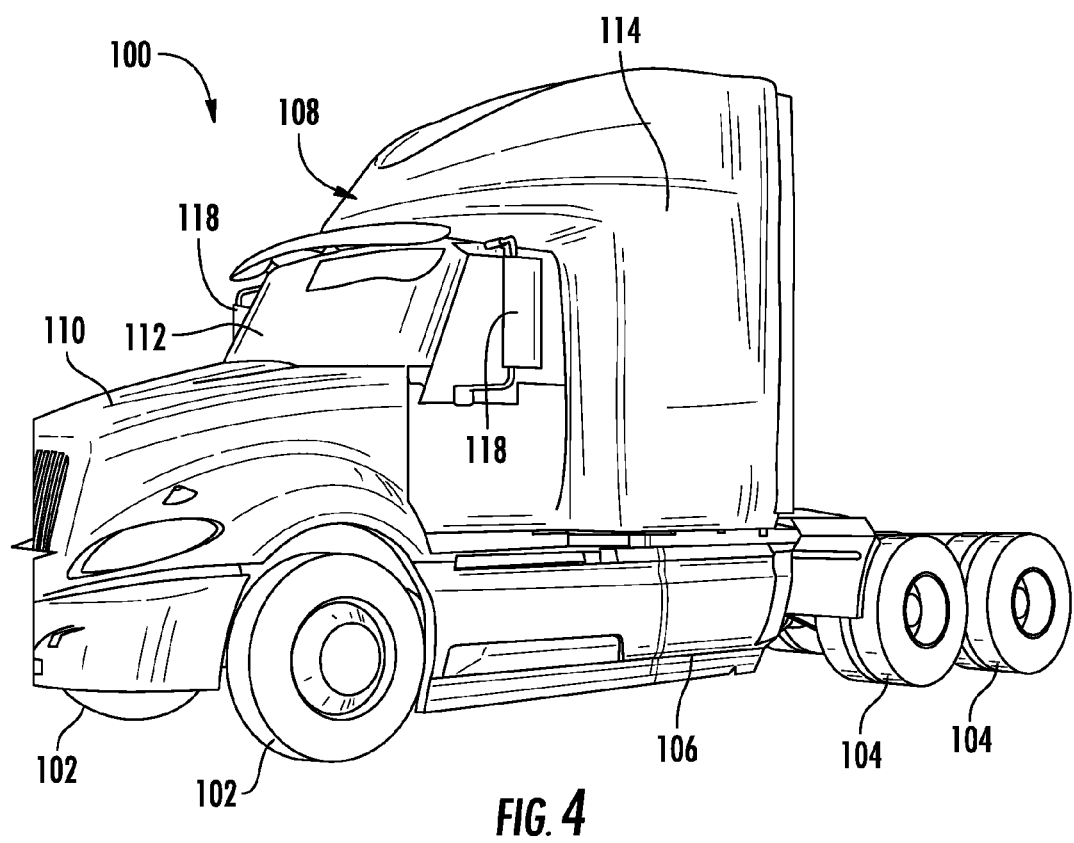
FIG. 4 illustrates a front, perspective view of the vehicle shown in FIG. 2.

Referring now to FIGS. 2-4, one embodiment of a heavy duty vehicle 100 is illustrated in accordance with aspects of the present subject matter. In general, the vehicle 100 may have any suitable configuration known in the art. For example, as shown in the illustrated embodiment, the vehicle 100 may include a pair of front wheels 102, one or more pairs of rear wheels 104 and a chassis 106 coupled to and supported by the wheels. A cab 108 and a hood compartment 110 may be supported by a front portion of the chassis 106. As particularly shown in FIG. 4, the cab 108 may include a windshield 112 at its forward end and a sleeper compartment 114 at its back end. Additionally, a trailer connection 116 (often referred to as a fifth wheel) may be supported by a rear portion of the chassis 106 for coupling the vehicle 100 to a trailer (not shown). Moreover, as will be described in greater detail below, the vehicle 100 may also include two side-view mirror assemblies 118 coupled to and extending outwardly from the cab 108 that are capable of reflecting a rearwardly extending side-view of the vehicle 100.

As used herein, the term "rearwardly extending side-view" refers to a view reflected by the mirror assemblies 118 that captures at least a portion of the area extending adjacent to the side of the vehicle 100. For example, as shown in FIG. 3, in one embodiment, the rearwardly extending side-view (indicated by the dashed lines) reflected by the mirror assemblies 118 may capture both a portion of the vehicle and a portion of the area extending adjacent to the vehicle's side, thereby allowing vehicles traveling along either side of the vehicle 100 to be viewed by the driver. However, in other embodiments, the rearwardly extending side-view reflected by the mirror assemblies 118 may only capture a portion of the area extending adjacent to the side of the vehicle 100 and, thus, may not include any portion of the vehicle itself.

As shown in FIGS. 2-4, the vehicle 100 is configured as a tractor-trailer (also known as semi tractors, tractors, class 8 long haul trucks, transfer trucks, 18-wheelers, semis, etc.). However, it should be appreciated that the configuration of the vehicle 100 described above and shown in FIGS. 2-4 is provided only to place the present subject matter in an exemplary field of use. Thus, it should be appreciated that the present subject matter may be readily adaptable to any manner of vehicle configuration. For example, as opposed to the sleeper cab 108 shown in FIG. 1, the vehicle 100 may instead have a cab-over-engine configuration. Moreover, in addition to tractor-trailers, the disclosed mirror assemblies 118 may also be readily adaptable for use with various other vehicles, such as other heavy-duty vehicles (e.g., work vehicles) and/or other road vehicles (e.g., cars and light trucks).

Figure 5:
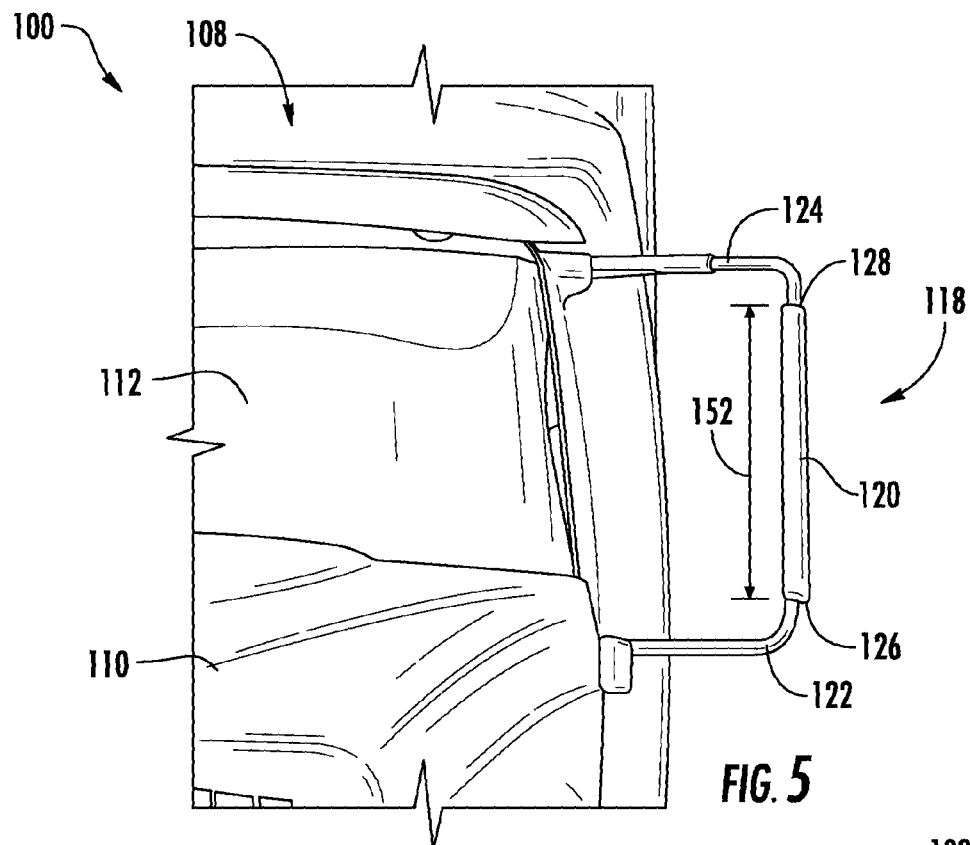
FIG. 5 illustrates a front view of one embodiment of a side mirror assembly in accordance with aspects of the present subject matter.
Figure 6:
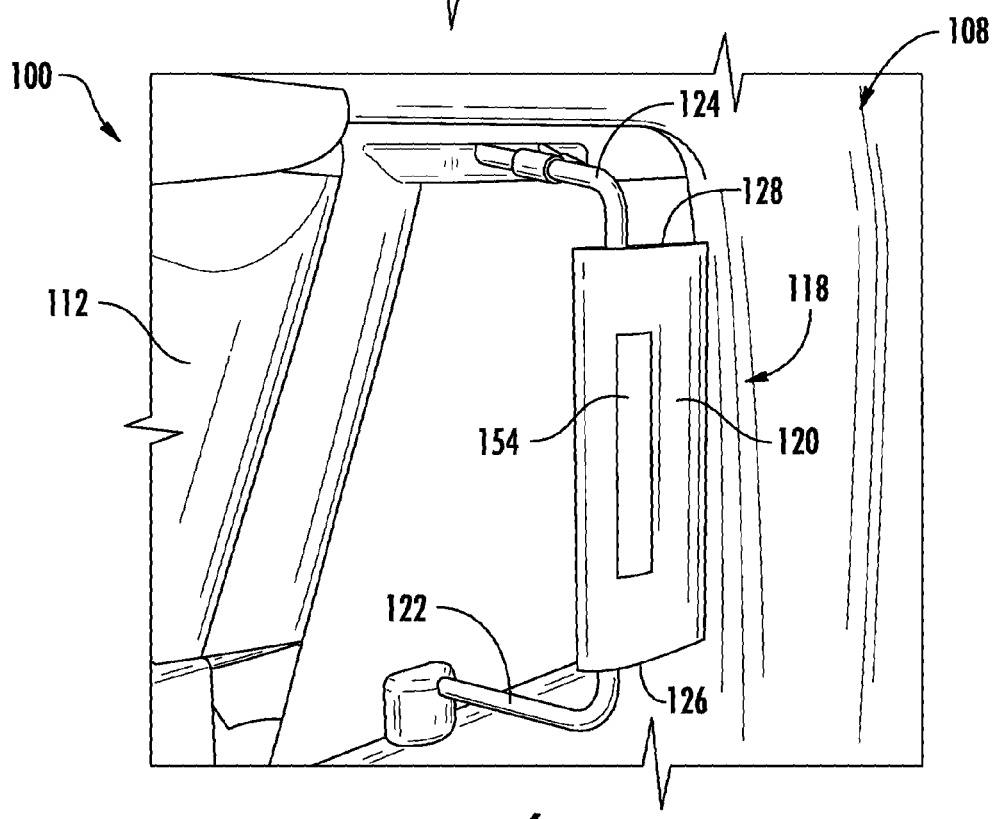
FIG. 6 illustrates a perspective view of the side mirror assembly shown in FIG. 5.
Figure 7:
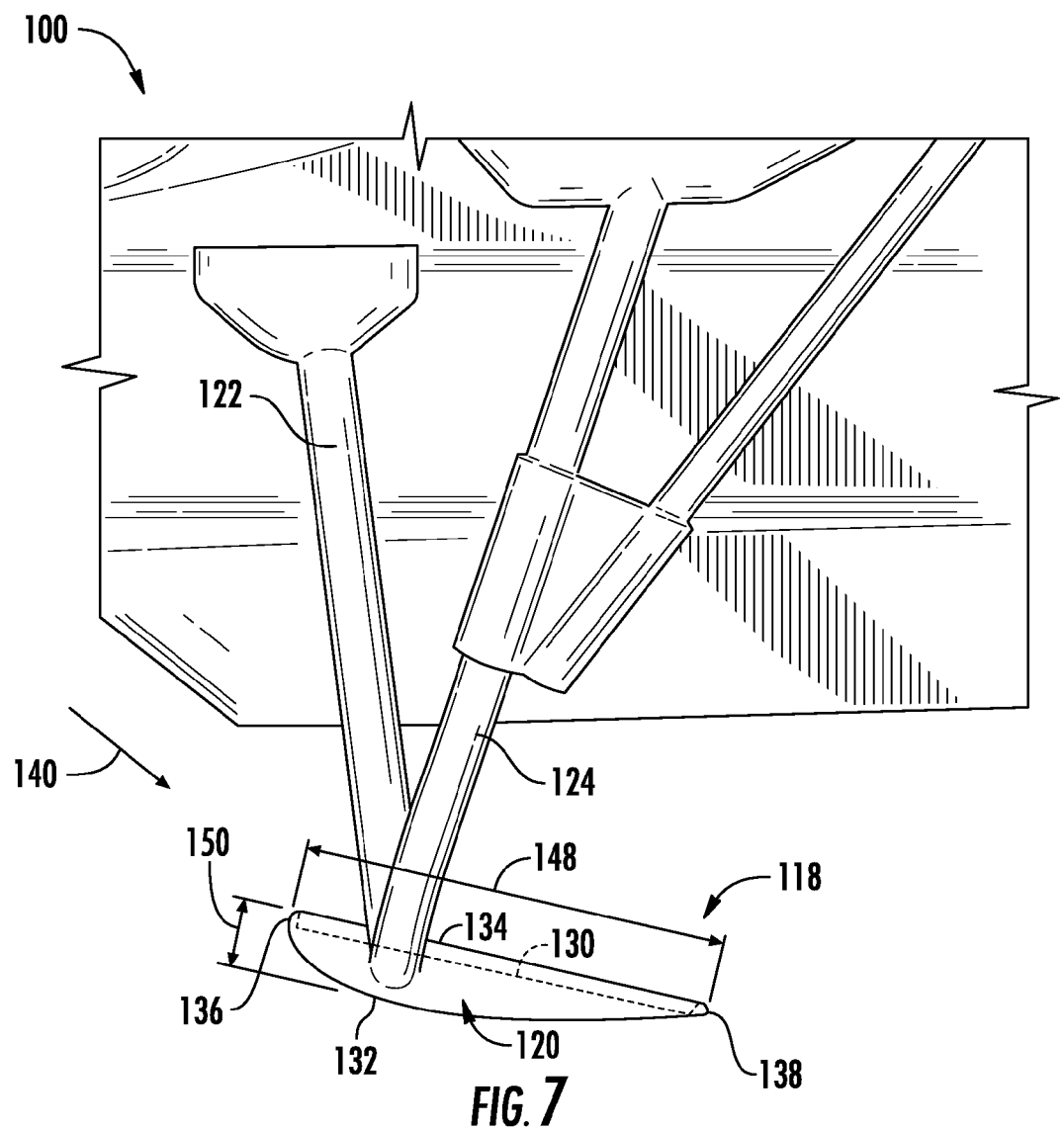
FIG. 7 illustrates a top view of the side mirror assembly shown in FIG. 5, particularly illustrating the assembly in a first, aerodynamic position.
Figure 8:
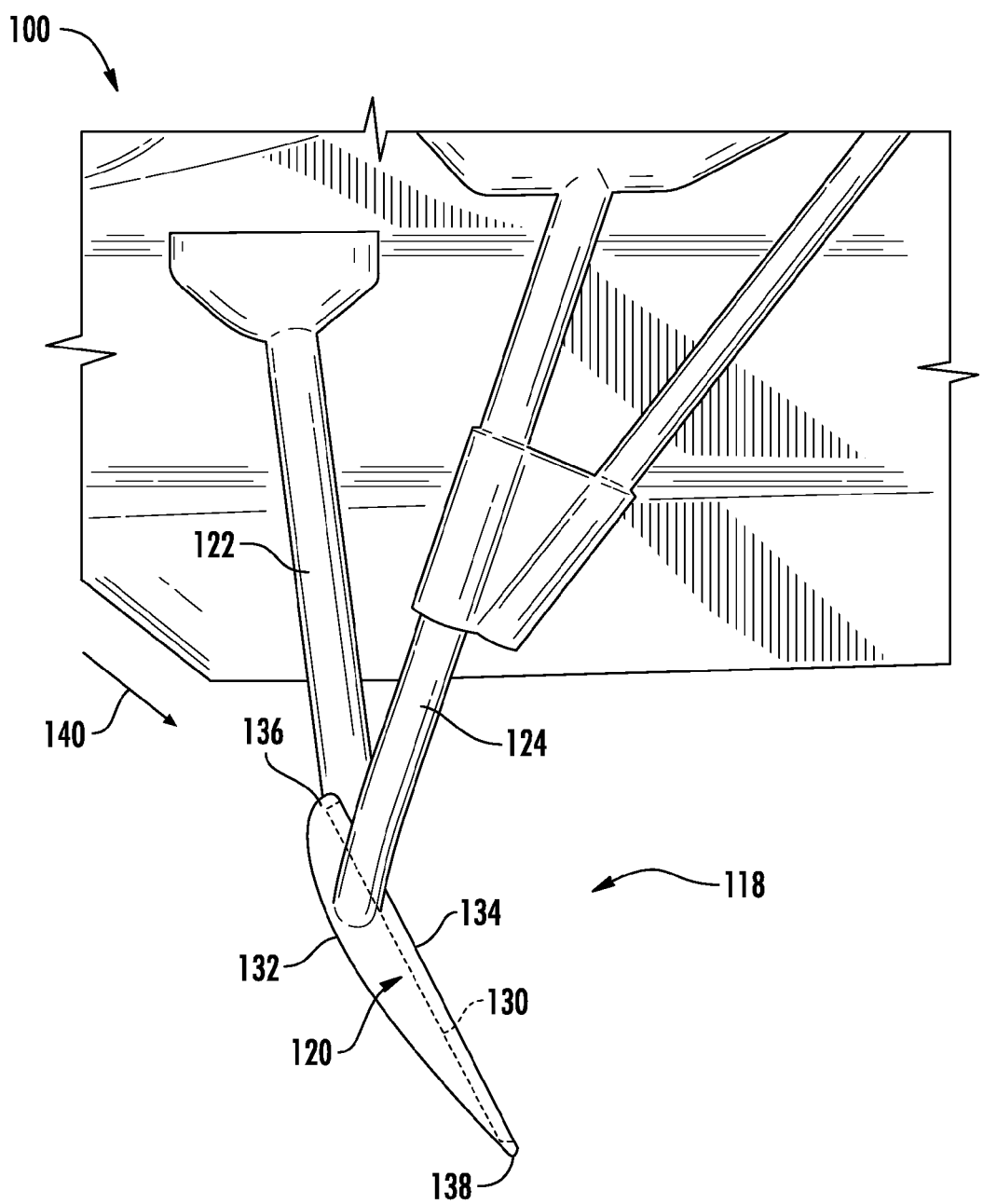
FIG. 8 illustrates another top view of the side mirror assembly shown in FIG. 5, particularly illustrating the assembly after it has been moved from the first position to a second position.
Figure 9:
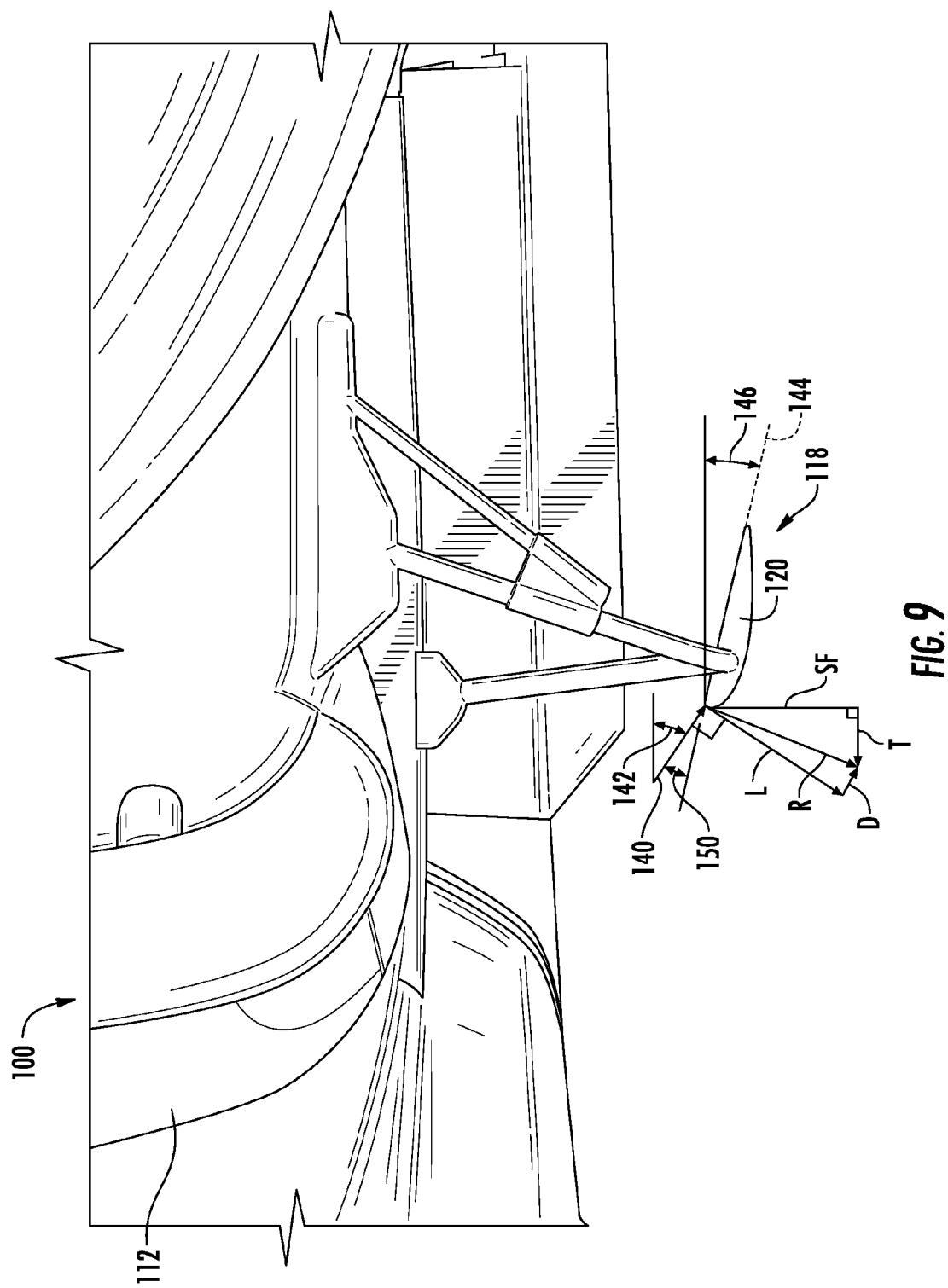
FIG. 9 illustrates yet another top view of the side mirror assembly shown in FIG. 5, particularly illustrating various aerodynamic loads acting on the side mirror assembly.

Referring now to FIGS. 5-9, various views of one embodiment of a side-view mirror assembly 118 suitable for use with the vehicle 100 described above (or any suitable other vehicle) are illustrated in accordance with aspects of the present subject matter. Specifically, FIGS. 5 and 6 illustrate front and perspective views of the mirror assembly 118, respectively. FIGS. 7 and 8 illustrate top views of the mirror assembly 118 in both a first position (FIG. 7) and a second position (FIG. 8). Additionally, FIG. 9 illustrates another top view of the mirror assembly 118 in the first position, particularly illustrating various aerodynamic loads that may act on the mirror assembly 118 during operation of the vehicle 100.

As shown, the mirror assembly 118 may include a mirror housing 120 configured to be coupled to the vehicle 100 using any suitable mounting structure 122, 124 known in the art. For example, as shown in the illustrated embodiment, the mounting structure 122, 124 includes a first support member 122 extending between the cab 108 and a bottom side 126 of the mirror housing 120 and a second support member 124 extending between the cab 108 and a top side 128 of the mirror housing 120. However, it should be appreciated that, in alternative embodiments, the mounting structure 122, 124 may have any other suitable configuration (including any number of support members coupled to the mirror housing 120).

The mirror assembly 118 may also include a mirror 130 (shown in dashed lines) supported within the mirror housing 120. The mirror 130 may generally be configured to be positioned on or within the housing 120 at any suitable location (e.g., on a surface defined by the housing 120 or within a cavity defined by the housing 120) that allows the mirror 130 to be viewed by the driver. As will be described below, in several embodiments, the mirror 130 may be positioned on or within the mirror housing 120 so as to form part of the overall shape of the housing 120.

As particularly shown in FIGS. 7-9, the mirror housing 120 may generally define an airfoil-shaped cross-section. For example, the mirror housing 120 may include a first side surface 132 (e.g., a pressure side surface) and a second side surface 134 (e.g., a suction side surface) extending between a forward edge 136 forming the rounded, leading edge of the airfoil-shape and an aft edge 138 forming the trailing edge of the airfoil-shape. As shown in FIGS. 7-9, in one embodiment, the first side surface 132 may define a curved profile (e.g., by forming a concave, arcuate shape between the forward and aft edges 136, 138) while the second side surface 134 may define a relatively planar profile between the forward and aft edges 136, 138 for accommodating the planar profile of the mirror 130. Moreover as shown in FIGS. 7-9, the aft edge 138 of the mirror housing 120 generally defines a relatively sharp trailing edge. However, in other embodiments, the aft edge 138 of the housing 120 may have a blunt configuration (e.g., by configuring the mirror housing 120 to define a flatback airfoil shape).

It should be appreciated that the second side surface 134 may, in several embodiments, be defined at least partially by the outer surface of the mirror 130. For example, in one embodiment, a cavity (not shown) may extend fully between the forward and aft edges 136, 138 and between the top and bottom sides 126, 128 of the mirror housing 120 such that the outer surface of the mirror 130 defines the entire second side surface 134. In another embodiment, the cavity may only extend partially between the forward and aft edges 136, 138 and between the top and bottom sides 126, 128 such that only a portion of the second side surface 134 is defined by the outer surface of the mirror 130. Alternatively, the mirror housing 120 may define a complete, planar surface extending between the forward and aft edges 136, 138 and between the top and bottom sides 126, 128, with the mirror 130 being configured to be positioned over all or a part of such planar surface.

In several embodiments, the mirror housing 120 may be configured to be rotatably or pivotally coupled to the mounting structure 122, 124, thereby allowing the orientation of the mirror assembly 118 to be adjusted relative to the vehicle 100. Specifically, as shown in the illustrated embodiment, the mirror housing 120 may be movable between a first position (FIG. 7), wherein the housing 120 is aerodynamically aligned with an airflow (indicated by arrow 140) flowing along the vehicle's cab 108 and, and a second position (FIG. 8), wherein the mirror 130 may be used by the driver to obtain a rearwardly extending side-view of the vehicle 100. As such, the mirror assembly 118 may be configured serve as an effective airfoil when in the first position and as an effective side-view mirror when in the second position.

For example, as shown in FIGS. 7 and 9, by properly orienting the forward edge 136 of the mirror housing 120 relative to the local airflow 140 flowing across the housing 120 (e.g., the cross-flow generated by the windshield 112), the total drag force acting on the assembly 118 may be reduced significantly due to the aerodynamic configuration of the housing 120. Moreover, as will be described below, the airfoil-shaped housing 120 may also produce a lift force having a force component directed in the travel direction of the vehicle 100, thereby allowing the mirror housing 120 to generate a thrusting force. However, as shown in FIGS. 7 and 9, when the mirror housing 120 is in the first position, the mirror 130 is generally oriented towards the vehicle 100 and, thus, does not provide a rearwardly extending side view of the vehicle 100. In other words, the reflection provided by the mirror 130 only captures the vehicle 100, itself, and does not capture any portion of the area extending adjacent to the side of the vehicle 100. Accordingly, when it is necessary to use the mirror 130 as an actual side-view mirror, the mirror housing 120 may be moved to the second position (as shown in FIG. 8) to permit the mirror 130 to reflect a rearwardly extending side-view of the vehicle 100.

By configuring the mirror housing 120 to be movable between the first and second positions, it should be appreciated that the disclosed mirror assembly 118 may be advantageously utilized with vehicles 100 including side-view vision systems. Specifically, as indicated above, current regulations require that vehicles 100 include an actual side-view mirror for instances when the vision system fails or is otherwise malfunctioning. Thus, in accordance with aspects of the present subject matter, when the vision system is functioning properly, the mirror housing 120 may be moved to the first position to allow the mirror assembly 118 to be used for drag reduction and/or thrust generation. However, if the vision system fails or is otherwise malfunctioning, the mirror housing 120 may be moved to the second position to allow the mirror 130 to be used as a back-up side-view mirror. Once the vision system is again functioning properly, the mirror housing 120 may then be moved back to the first position.

It should be appreciated that the drag reduction provided by the disclosed mirror assembly 118 is generally a function of the lifting force created when the local airflow 140 is directed along the assembly 118. For example, as shown in FIG. 9, the cross-flow or airflow 140 directed from the windshield 112 is generally oriented at an angle 142 relative to the direction of travel of the vehicle 100. For most conventional heavy duty vehicles (e.g., vehicle 100), this angle 142 typically ranges from about 15 degrees to about 35 degrees, such as from about 20 degrees to about 30 degrees or from about 20 degrees to about 25 degrees and any other subranges therebetween. However, it is foreseeable that, for other vehicle configurations, the angle 142 may be less than 15 degrees or greater than 35 degrees.

To ensure that the mirror housing 120 is properly aligned with the airflow 140, it may be desirable for a chord line 144 (FIG. 9) of the housing 120 (i.e., a reference line extending between the forward and aft edges 136, 128) to be substantially aligned with the general direction of the cross-flow 140. For example, in several embodiments, when the mirror housing 120 is in the first position, the chord line 144 may be oriented at an angle 146 relative to the direction of travel of the vehicle 100 that is equal to the angle 142 of the local airflow 140 minus a reference angle 150 corresponding to the angle-of-attack of the mirror housing 120 (i.e., the angle of the chord line 144 relative to the local airflow 140). In other words, the angle 146 may be determined according the following equation:

$$\alpha_{chord} = \alpha_{flow} - \alpha_{AOA}$$

Wherein, $\alpha_{chord}$ corresponds to the angle 146 of the chord line 144, $\alpha_{flow}$ corresponds to the angle 142 of the local airflow 140 and $\alpha_{AOA}$ corresponds to the reference angle 150 (i.e., the angle-of-attack of the mirror housing 120). It should be appreciated that, in several embodiments, the reference angle 150 may generally range from about −5 degrees to about 25 degrees, such as from about 0 degrees to about 20 degrees or from about 5 degrees to about 15 degrees and any other subranges therebetween.

By properly orienting the mirror housing 120 relative to the airflow 140, a lifting force (L) may be generated in a direction perpendicular to the airflow 140 while a drag force (D) may be generated in a direction parallel to the airflow 140. As shown in FIG. 9, due to the angle 142 of the cross-flow 140, the resultant force (R) may have a component (SF) directed perpendicular to the direction of travel that acts a side force and a component (T) directed in the direction of the travel that acts as a thrusting force. As should be generally understood, the thrusting force (T) may be equal to the lifting force (L) times the sin of the crossflow angle 142. Through experimentation, it has been determined that, when the disclosed mirror housing 120 properly oriented in the first position, the thrusting force (T) is greater than the drag force (D) acting on the housing 120. As such, a net thrust force may be generated that acts on the mirror assembly 118 in the direction of travel of the vehicle 100.

It should be appreciated that, in general, the mirror housing 120 may have any suitable dimensions that allow it function as described herein. However, in one embodiment, a length 148 of the mirror housing 120 (defined between the forward and aft edges 136, 138) may range from about 7 inches to about 11 inches, such as from about 8 inches to about 10 inches or from about 8.5 inches to about 9.5 inches and any subranges therebetween. Similarly, in one embodiment, a maximum width 150 of the housing 120 (defined between the first and second side surfaces 132, 134) may range from about 0.5 inches to about 3 inches, such as from about 1 inch to about 2 inches or from about 1.2 inches to about 1.4 inches and any other subranges therebetween. Additionally, in one embodiment, a height 152 of the mirror housing 120 (defined between the top and bottom sides 126, 128) may range from about 15 inches to about 35 inches, such as from about 20 inches to about 30 inches or form about 23 inches to about 25 inches and any other subranges therebetween.

Moreover, in a particular embodiment of the present subject matter, the length 148 of the mirror housing 120 may be at least three times greater than the width 150 of the housing 120, such as by configuring the length 148 to be more than four times greater than the width 150 or by configuring the length 148 to be more than five times greater than the width 150. By dimensioning the mirror housing 120 in such a manner, the mirror assembly 118 may serve as a high aspect ratio wing operating in the crossflow 140 generated by the vehicle windshield 122 with no base drag. The efficient wing, together with the lack of base drag, may provide a significant amount of thrust relative to the direction of travel of the vehicle 100 and may significantly reduce the drag penalty associated with the disclosed mirror assembly 118 to a much larger extent than suitably shaped, fixed mirror assemblies.

As indicated above, in addition to providing a means to reduce drag and/or generate thrust, the disclosed mirror assembly 118 may also serve as a means for stabilizing the airflow along the cab 108, thereby preventing side-to-side motion of the vehicle 100. Thus, even if the current regulations are changed such that side-view mirror assemblies are no longer necessary for a vehicle that includes a vision system, it may still be advantageous to install the disclosed mirror assembly 118 onto a vehicle in order to provide the side-to-side stabilization needed for desired vehicle performance and operation.

It should be appreciated that the mirror assembly 118 may also include various other components typically included within conventional mirror assemblies. For example, a lighting kit 154 (FIG. 6) may be positioned on the first side surface 132 of the mirror housing 120 (or at any other suitable location along the housing 120). In addition, it should be appreciated that the mounting structure 122, 143 described above may include any suitable mounting hardware, such as common fasteners (e.g., nuts, bolts, or the like), latches, hooks, ties, adhesives, magnets and/or the like, that may be utilized in coupling the mirror assembly 118 to the vehicle 100 and/or any suitable rotational attachment mechanisms, such as bearings, pins, pivot joints and/or the like, that may be utilized to permit the mirror housing 120 to be rotated or pivoted between the first and second positions.

It should also be appreciated that the various components of the mirror assembly 118 may generally be formed from any suitable material known in the art. For instance, metals, plastics, or the like may be utilized to form any and/o all of the components of the mirror assembly 118.

Figure 10:
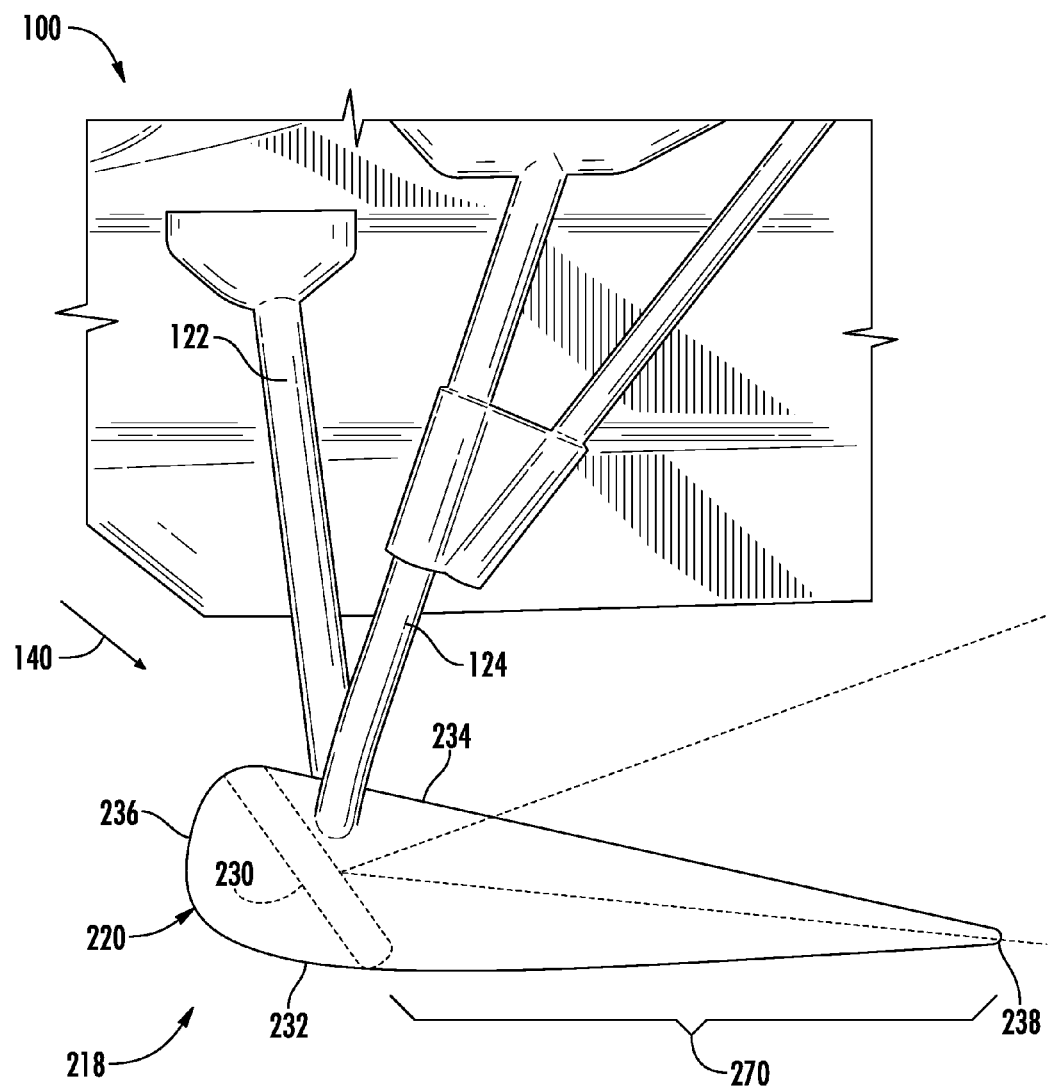
FIG. 10 illustrates a top view of another embodiment of a side mirror assembly in accordance with aspects of the present subject matter.

Referring now to FIG. 10, another embodiment of a side-view mirror assembly 218 suitable for use with the vehicle 100 described above (or any suitable other vehicle) is illustrated in accordance with aspects of the present subject matter. As shown, the mirror assembly 218 may be configured similar to the mirror assembly 118 described above. For example, the mirror assembly 218 may include an airfoil-shaped mirror housing 220 and a mirror 230 (shown in dashed lines) supported within the mirror housing 220. The mirror housing 220 may include a first side surface 232 (e.g., a pressure side surface) and a second side surface 234 (e.g., a suction side surface) extending between a forward edge 236 forming the rounded, leading edge of the airfoil-shape and an aft edge 238 forming the trailing edge of the airfoil-shape. However, unlike the embodiment described above in which the mirror 130 is generally aligned with and/or forms part of the second side surface 134 of the mirror housing 120, the mirror 230 may be oriented within the mirror housing 220 at an angle relative to the second side surface 234. As such, the mirror 230 may provide a rearwardly extending side-view of the vehicle 100 while the mirror housing 220 is in the first position (i.e., when the housing 230 is aerodynamically aligned with the airflow 140 generated by the vehicle's windshield 112), thereby eliminating the necessity of moving the mirror housing 220 to the second position to provide the driver with a proper side-view of the vehicle 100. In such an embodiment, an aft portion 270 of the mirror housing 220 (i.e., the portion disposed aft of the mirror 230) may be open or may otherwise be transparent to allow the mirror 230 to provide the driver with a rearwardly extending side-view of the vehicle 100 while the mirror housing 220 is still in the first position.

The following examples are meant to illustrate the disclosure described herein and are not intended to limit the scope of this disclosure.

EXAMPLES

The aerodynamic drag associated with side-view mirror assemblies were assessed using NASA's Fully Unstructured Navier-Stokes 3D (FUN 3D) Computational Fluid Dynamics (CFD) model (described in detail at http://fun3d.larc.nasa.gov). In addition, the aerodynamic drag reductions associated with the disclosed mirror assemblies 118, 218 were demonstrated using industry standard coast down tests. The tests were conducted at the Kennedy Space Center located at Merritt Island, Fla. The coast down tests conducted at Kennedy Space Center measured the amount of time it took a vehicle to slow down from 80 mph to approximately 0 mph. The test vehicle was accelerated to 80 mph by the driver and then put into neutral. The test vehicle was then coasted along a straight line until it reached zero mph or otherwise reached the end of the runway. The amount of time it takes a vehicle to perform the coast down test is a direct indicator of the vehicle's aerodynamic drag, tire rolling resistance, and mechanical drivetrain system frictional losses. During the coast down tests, the coast down times for a test vehicle equipped with conventional side view mirrors (e.g., the mirror assembly 12 shown in FIG. 1), were compared to the coast down times of the same vehicle equipped with the side view mirror assemblies 118, 218 disclosed herein. The coast down times were then converted into aerodynamic drag coefficients.

Results of computational fluid dynamics modeling and simulations and Kennedy Space Center coast down testing are provided in Table II. In particular, Table II shows the drag coefficient of a long haul tractor-trailer equipped with conventional mirror assemblies compared to the same tractor equipped with the mirror assemblies 118, 218 disclosed herein. As shown, the disclosed mirror assemblies 118, 218 provided a percent improvement of up to about 5.5%

TABLE II

|  | Tractor-Trailer equipped with conventional side view mirrors | Tractor-Trailer equipped with mirror housing in accordance with the present disclosure | Percent Improvement |
| --- | --- | --- | --- |
| Cd as calculated by NASA's FUN 3-D Computational Fluid Dynamics Software | .5887 | .5563 | 5.4% |
| Cd as calculated by Coast down test | .587 | .558 | 5.0% |

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for enhancing the operation of a vehicle having a vision system configured to provide a rearwardly extending side-view of the vehicle, the method comprising:
   operating the vehicle with a side-view mirror assembly installed thereon, the mirror assembly including a mirror housing defining an airfoil shape have a first side surface and a second side surface extending between a forward edge and an aft edge;
   positioning the mirror housing at a first position at which the mirror housing is aerodynamically aligned with an airflow flowing past the vehicle when the vision system is being used to provide the rearwardly extending side-view of the vehicle, wherein a mirror of the mirror assembly only reflects a view directed towards a portion of the vehicle when the mirror housing is located at the first position; and
   moving the mirror housing to a second position at which the mirror housing is not aerodynamically aligned with the airflow flowing past the vehicle when the vision system is not being used to provide the rearwardly extending side-view of the vehicle, Wherein the mirror reflects the rearwardly extending side-view of the vehicle when the mirror is moved to the second position.

2. The method of claim 1, further comprising moving the mirror housing back to the first position when the vision system is again being used to provide the rearwardly extending side-view of the vehicle.

3. The method of claim 1, wherein, when in the first position, the mirror housing is oriented relative to the airflow such that a net thrusting force is generated in a direction of travel of the vehicle.

4. The method of claim 1, wherein, when in the second position, the mirror housing is oriented relative to the airflow such that a net drag force is generated in a direction opposite a direction of travel of the vehicle.

5. The method of claim 1, wherein the forward edge of the mirror housing defines a leading edge of the airfoil shape and the aft edge defines a trailing edge of the airfoil shape.

6. The method of claim 5, wherein the trailing edge is configured as a sharp trailing edge.

7. The method of claim 1, wherein the mirror housing defines a width between the first side surface and the second side surface and further defines a length between the forward edge and the aft edge, the length being at least three times greater than the width.

8. The method of claim 1, wherein the airflow is oriented at an airflow angle relative to a direction of travel of the vehicle ranging from about 15 degree to about 25 degrees.

9. The method of claim 8, wherein a chord line is defined between the forward edge and the aft edge, wherein positioning the mirror housing at the first position comprises positioning the mirror housing such that the chord line is oriented at an angle relative to the direction of travel of the vehicle that is equal to the airflow angle minus a reference angle, the reference angle corresponding to an angle-of-attack of the mirror housing.

10. The method of claim 9, wherein the reference angle ranges from about −5 degrees to about 25 degrees.

11. A vehicle having a vision system configured to provide a rearwardly extending side-view of the vehicle, the vehicle further comprising:
   a chassis;
   a cab supported by the chassis;
   mounting structure coupled to and extending outwardly from the cab; and
   a mirror assembly coupled to the mounting structure, the mirror assembly comprising:
      a mirror housing configured to support a mirror, the mirror housing defining an airfoil shape have a first side surface and a second side surface extending between a forward edge and an aft edge, the mirror housing being configured to be moved to a first position when the vision system is being used to provide the rearwardly extending side-view of the vehicle and to a second position when the vision system is not being used to provide the rearwardly extending side-view of the vehicle,
   wherein, when in the first position, the mirror housing is aerodynamically aligned with an airflow flowing past the vehicle and the mirror only reflects a view directed towards a portion of the vehicle, and wherein, when in the second position, the mirror housing is not aerodynamically aligned with the airflow flowing past the vehicle and the mirror reflects the rearwardly extending side-view of the vehicle.

12. The vehicle of claim 11, wherein, when in the first position, the mirror housing is oriented relative to the airflow such that a net thrusting force is generated in a direction of travel of the vehicle.

13. The vehicle of claim 11, wherein, when in the second position, the mirror housing is oriented relative to the airflow such that a net drag force is generated in a direction opposite a direction of travel of the vehicle.

14. The vehicle of claim 11, wherein the forward edge of the mirror housing defines a leading edge of the airfoil shape and the aft edge defines a trailing edge of the airfoil shape.

15. The vehicle of claim 14, wherein the trailing edge is configured as a sharp trailing edge.

16. The vehicle of claim 11, wherein the mirror housing defines a width between the first side surface and the second side surface and further defines a length between the forward edge and the aft edge, the length being at least three times greater than the width.

17. The vehicle of claim 11, wherein the airflow is oriented at an airflow angle relative to a direction of travel of the vehicle ranging from about 15 degree to about 25 degrees.

18. The vehicle of claim 17, wherein a chord line is defined between the forward edge and the aft edge, the chord line being oriented at an angle relative to the direction of travel of the vehicle that is equal to the airflow angle minus a reference angle when the mirror housing is located at the first position, the reference angle corresponding to an angle-of-attack of the mirror housing.

19. The vehicle of claim 18, wherein the reference angle ranges from about −5 degrees to about 25 degrees.

* * * * *